(12) United States Patent
Masumoto et al.

(10) Patent No.: US 7,943,892 B2
(45) Date of Patent: May 17, 2011

(54) PROJECTION IMAGE GENERATION APPARATUS, METHOD FOR GENERATING PROJECTION IMAGE OF MOVING TARGET, AND PROGRAM

(75) Inventors: Jun Masumoto, Ichikawa (JP); Masaki Miyamoto, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 518 days.

(21) Appl. No.: 12/100,794

(22) Filed: Apr. 10, 2008

(65) Prior Publication Data
US 2008/0259282 A1 Oct. 23, 2008

(30) Foreign Application Priority Data

Apr. 12, 2007 (JP) ................................ 2007-105286

(51) Int. Cl.
*H01L 27/00* (2006.01)
*G06T 15/00* (2011.01)
(52) U.S. Cl. ..................................... 250/208.1; 345/419
(58) Field of Classification Search ......... 353/7; 382/131, 382/128, 154; 250/208.1, 221, 214.1, 214 R; 600/160, 166, 109, 111; 356/12; 345/419–427, 345/619, 649, 655; 378/21, 23, 93–95, 41; 348/42–51, E13.001–E13.004
See application file for complete search history.

(56) References Cited

U.S. PATENT DOCUMENTS

| | | | | |
|---|---|---|---|---|
| 5,953,013 | A * | 9/1999 | Shimizu ........................ | 345/419 |
| 7,400,700 | B2 * | 7/2008 | Erbel .............................. | 378/41 |
| 2002/0049375 | A1 * | 4/2002 | Strommer et al. ............ | 600/407 |
| 2006/0229513 | A1 * | 10/2006 | Wakai .......................... | 600/407 |
| 2006/0284879 | A1 * | 12/2006 | Nagata et al. ................. | 345/582 |
| 2007/0236514 | A1 * | 10/2007 | Agusanto et al. ............. | 345/646 |

FOREIGN PATENT DOCUMENTS

| | | |
|---|---|---|
| JP | 2006-87573 A | 4/2006 |
| JP | 2006-288495 | 10/2006 |

OTHER PUBLICATIONS

Ji et al., IEEE Transactions on Visualization and Computer Graphics, vol. 12, No. 5, Sep./Oct. 2006. pp. 1109-1116.
Christie et al., Camera Control in Computer Graphics, vol. 25, No. 3, 2006, pp. 1-25, XP-002499179.
Bordoloi et al., View Selection for Volume Rendering, IEEE Visualization Oct. 23-28, 2005, pp. 487-494.
Dirk Bartz, Computer Graphics Forum, Virtual Endoscopy in Research and Clinical Practise, vol. 24, No. 1, 2005, pp. 111-126. XP007905873.

* cited by examiner

*Primary Examiner* — Que T Le
*Assistant Examiner* — Jennifer Bennett
(74) *Attorney, Agent, or Firm* — Birch, Stewart, Kolasch & Birch, LLP

(57) ABSTRACT

Projection is performed in such a manner that the same point on a moving internal organ can be constantly observed, thereby improving the accuracy of diagnosis. Motion information about the motion of a projection target between one set of three-dimensional volume data in a group of sets of three-dimensional volume data and a different set of three-dimensional volume data in the group of sets of three-dimensional volume data that was obtained by imaging at a different time from the time of imaging of the one set of three-dimensional volume data is obtained based on the projection target that is present in the one set of three-dimensional volume data and the projection target that is present in the different set of three-dimensional volume data. Then, the viewpoint of projection is moved to a position at which the projection target in the different set of three-dimensional volume data can be projected.

4 Claims, 6 Drawing Sheets

PROJECTION IMAGE GENERATION APPARATUS, METHOD FOR GENERATING PROJECTION IMAGE OF MOVING TARGET, AND PROGRAM

BACKGROUND OF THE INVENTION

1. Field of the Invention

The present invention relates to a projection image generation apparatus and method for generating a projection image based on three-dimensional volume data and a program for the apparatus and the method.

2. Description of the Related Art

Conventionally, a medical image display apparatus that has a mode for observing the inner surface of a tubular hollow organ (a tubular cavity or a lumen) of a subject to examine a diseased region (diseased tissue) of the tubular hollow organ, such as blood vessels, intestines, bronchi and arteries, has been known. This mode imitates the function of an endoscope and the inner surface of the tubular hollow organ can be observed as if a user is viewing the inner surface from the inside of the lumen.

In most of such medical image display apparatuses, projection images are generated based on three-dimensional volume data. However, it has been impossible to observe a temporal change in the diseased region of the tubular hollow organ. Therefore, a medical image display apparatus that can be used to observe a change with the passage of time and to observe the tubular hollow organ from various viewpoints has been proposed. In the medical image display apparatus, four-dimensional data that have time information are used. The four-dimensional data include a plurality of sets of three-dimensional volume data that have been obtained by imaging a subject at time intervals $\Delta t$ (for example, Japanese Unexamined Patent Publication No. 2006-087573).

However, if perspective projection is constantly performed from the same viewpoint with respect to volume data of different temporal phases, the viewpoint, from which the surface of an organ is projected, may become submerged in the organ (positioned within the organ) in some cases, because the organ is moving. Then, it becomes impossible to project the same position of the organ.

SUMMARY OF THE INVENTION

In view of the foregoing circumstances, it is an object of the present invention to provide a projection image generation apparatus and method that can make it possible to accurately diagnose a patient by projecting images in such a manner that the same position on a moving organ of the patient is constantly observed. Further, it is an object of the present invention to provide a program for the apparatus and the method.

A projection image generation apparatus according to the present invention is a projection image generation apparatus comprising:

a volume data storage means for storing a group of sets of three-dimensional volume data that have been obtained by imaging a subject at predetermined time intervals;

a first projection means for generating a projection image by projecting a projection target that is present in one set of three-dimensional volume data in the group of sets of three-dimensional volume data from one viewpoint;

a motion information obtainment means for obtaining, based on the projection target that is present in the one set of three-dimensional volume data and the projection target that is present in a different set of three-dimensional volume data in the group of sets of three-dimensional volume data that was obtained by imaging at a different time from the time of imaging of the one set of three-dimensional volume data, motion information about the motion of the projection target between the two sets of three-dimensional volume data;

a viewpoint movement means for moving the viewpoint based on the motion information that has been obtained by the motion information obtainment means; and a second projection means for generating a projection image by projecting, from a viewpoint to which the viewpoint has been moved by the viewpoint movement means, the projection target that is present in the different set of three-dimensional volume data.

A program of the present invention is a program for causing a computer to function as:

a first projection means for generating a projection image by projecting, from one viewpoint, a projection target that is present in one set of three-dimensional volume data in a group of sets of three-dimensional volume data that have been obtained by imaging a subject at predetermined time intervals;

a motion information obtainment means for obtaining, based on the projection target that is present in the one set of three-dimensional volume data and the projection target that is present in a different set of three-dimensional volume data in the group of sets of three-dimensional volume data that was obtained by imaging at a different time from the time of imaging of the one set of three-dimensional volume data, motion information about the motion of the projection target between the two sets of three-dimensional volume data;

a viewpoint movement means for moving the viewpoint based on the motion information that has been obtained by the motion information obtainment means; and a second projection means for generating a projection image by projecting, from a viewpoint to which the viewpoint has been moved by the viewpoint movement means, the projection target that is present in the different set of three-dimensional volume data.

Further, a projection image generation method of the present invention is a projection image generation method comprising:

a first projection step for generating a projection image by projecting, from one viewpoint, a projection target that is present in one set of three-dimensional volume data in a group of sets of three-dimensional volume data that have been obtained by imaging a subject at predetermined time intervals;

a motion information obtainment step for obtaining, based on the projection target that is present in the one set of three-dimensional volume data and the projection target that is present in a different set of three-dimensional volume data in the group of sets of three-dimensional volume data that was obtained by imaging at a different time from the time of imaging of the one set of three-dimensional volume data, motion information about the motion of the projection target between the two sets of three-dimensional volume data;

a viewpoint movement step for moving the viewpoint based on the motion information that has been obtained in the motion information obtainment step; and a second projection step for generating a projection image by projecting, from a viewpoint to which the viewpoint has been moved in the viewpoint movement step, the projection target that is present in the different set of three-dimensional volume data.

The term "projection target" refers to a structure to be projected, which is one of structures included in three-dimensional voxel data. For example, when volume data are obtained by imaging a human body, the projection target is each tissue, such as epithelial tissue, connective tissue and nerve tissue, or each organ, such as blood vessels, intestines, bronchi, arteries and a heart.

Further, it is desirable that if the position of the viewpoint is present on the inner side of the surface of the projection target when the one set of three-dimensional volume data is projected, the viewpoint movement means moves the viewpoint so that the viewpoint is present on the inner side of the surface of the projection target in the different set of three-dimensional volume data, and that if the position of the viewpoint is present on the outer side of the surface of the projection target when the one set of three-dimensional volume data is projected, the viewpoint movement means moves the viewpoint so that the viewpoint is present on the outer side of the surface of the projection target in the different set of three-dimensional volume data.

According to the present invention, when the surface of a projection target included in two sets of three-dimensional volume data that have been obtained at a certain time interval has moved between the two sets of three-dimensional volume data, a viewpoint is moved based on the motion of the surface so that the same position of the surface of the projection target is constantly projected. Since projection images are generated in such a manner, it is possible to observe a region of interest in an organ or tissue that is moving, thereby improving the accuracy of diagnosis.

DESCRIPTION OF THE PREFERRED EMBODIMENTS

Figures 1, 2:
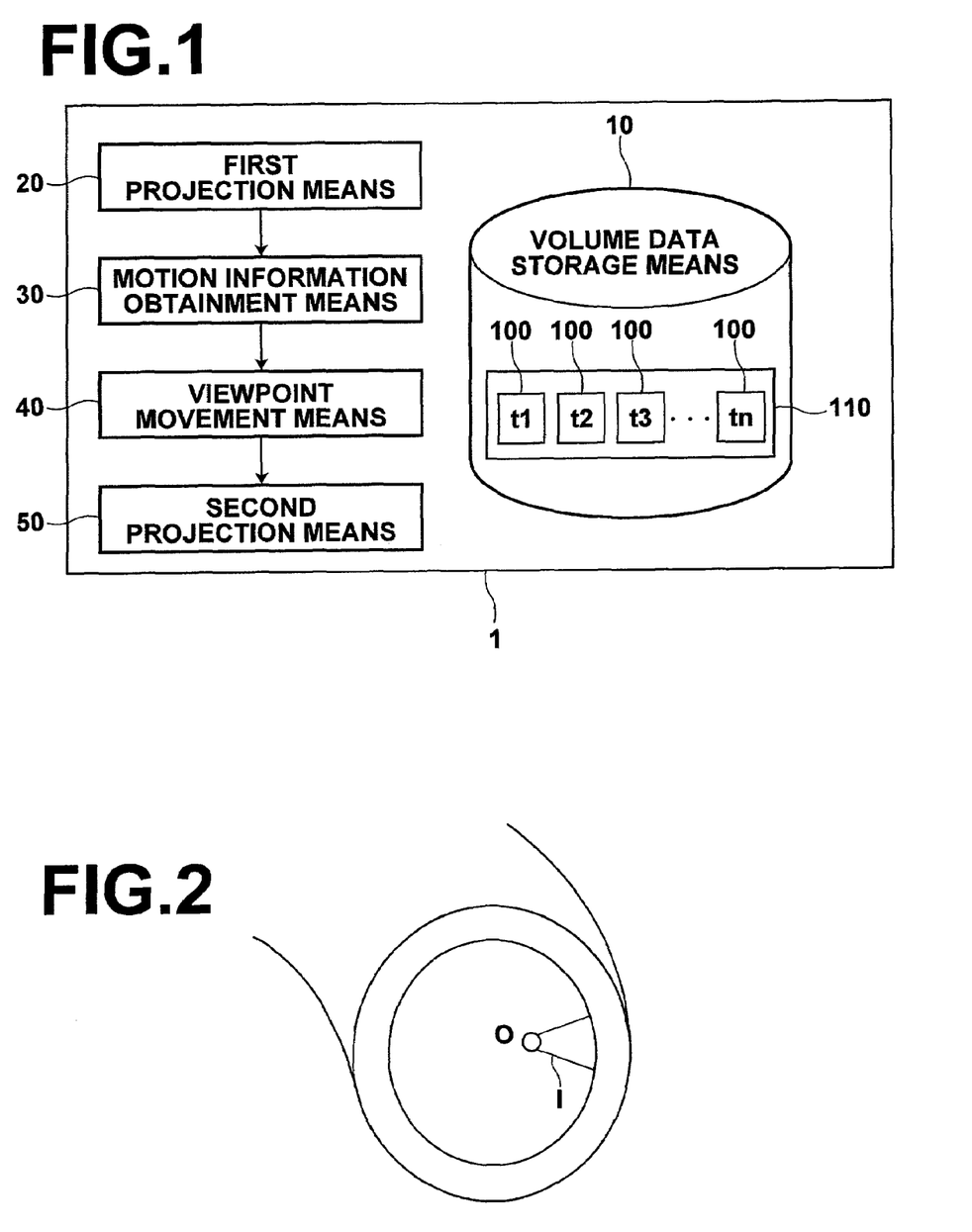
FIG. 1 is a schematic diagram illustrating the configuration of a projection image generation apparatus.
FIG. 2 is a diagram for explaining the position of a projection target (organ) and the position of a viewpoint in three-dimensional volume data.

Hereinafter, embodiments of a projection image generation apparatus according to the present invention will be described in detail with reference drawings. FIG. 1 is a schematic diagram illustrating the configuration of the projection image generation apparatus according to the present invention. The configuration of a projection image generation apparatus 1, as illustrated in FIG. 1, is realized by causing a computer to execute a projection image generation processing program that is stored in an auxiliary storage apparatus. At this time, the projection image generation processing program is stored in a recording medium, such as a CD-ROM (compact disc read-only memory), or distributed through a network, such as the Internet, and installed in the computer.

In the present embodiment, a case of generating (creating) a projection image similar to an image that can be obtained by actually imaging the inner surface of a tubular hollow organ, such as blood vessels, intestines, bronchi and arteries, from the inside thereof by using an endoscope or the like will be specifically described, as an example. Particularly, in the present embodiment, a case of generating projection images of the inner wall of the intestines similar to images that are obtained by actually imaging the inner wall of the intestines by using an endoscope will be described.

The projection image generation apparatus 1 of the present invention includes a volume data storage means 10, a first projection means 20, a motion information obtainment means 30, a viewpoint movement means 40 and a second projection means 50. The volume data storage means 10 stores a group of sets of three-dimensional volume data 100 that have been obtained by imaging the abdomen of a subject at predetermined time intervals $\Delta t$. The first projection means 20 generates a projection image by projecting the inner wall of the intestines from one viewpoint. The intestines are a projection target that is present in three-dimensional volume data 100 at time t, which are one set of three-dimensional volume data in a group of sets of three-dimensional volume data 100. The motion information obtainment means 30 obtains, based on the intestines that are present in the three-dimensional volume at time t and the intestines that are present in three-dimensional volume data 100 at time t+$\Delta t$, which is different from time t, motion information about the motion of the intestines between the two sets of three-dimensional volume data 100. The viewpoint movement means 40 moves the viewpoint, based on the motion information, to a position from which the inner wall of the intestines that are present in the three-dimensional volume data 100 at time t+$\Delta t$ can be projected. The second projection means 50 generates a projection image by projecting, from the position to which the viewpoint has been moved, the intestines that are present in the three-dimensional volume data 100 at time t+$\Delta t$.

The three-dimensional volume data 100 are obtained by superposing two-dimensional tomographic images (cross-sectional images) data that are sequentially obtained along a direction perpendicular to the cross-sectional plane of an object that is a target. The three-dimensional volume data 100 are generated by superposing, one on another, a plurality of tomographic images that have been obtained by imaging by using a CT (computed tomography) apparatus, an MRI (magnetic resonance imaging) apparatus or the like. For example, in volume data that have been obtained by using a CT apparatus, an absorption amount of X-rays for each voxel has been stored. A single voxel value (in this case, a value representing the absorption amount of X-rays) is provided as data for each voxel. Hereinafter, the picture-element value of each voxel is referred to as a voxel value.

Further, the subject is imaged at time intervals $\Delta t$ and four-dimensional volume data 110 (a group of sets of three-dimensional volume data 100) are generated. The four-dimensional volume data 110 include a series of sets of three-dimensional volume data that have been obtained by imaging the subject at time t1, t2, t3, . . . , tn.

The storage means 10 is a high-capacity storage apparatus, such as a hard disk. The four-dimensional volume data 110 are stored in the storage means 10.

The first projection means 20 sets viewpoint O at a position in volume data 100, the position corresponding to the position of a camera of an endoscope, as illustrated in FIG. 2. The first projection means 20 sets the viewpoint O so that the condition of projection becomes substantially the same as the condition at the time of imaging the inner wall of the intestines from the inside thereof by using the endoscope or the like. Then, the first projection means 20 performs perspective projection by using the voxel values of voxels corresponding to a portion of the inner wall of the intestines through which a line of vision or sight (projection line) 1 that extends from the viewpoint O toward the surface of the inner wall of the intestines passes. Accordingly, a projection image in which the portion of the inner wall of the intestines has been projected is generated.

The motion information obtainment means 30 obtains, based on the position of the intestines that are present in the three-dimensional volume data at time t and the position of the intestines that are present in the three-dimensional volume data at time t+Δt, motion information about the motion of the intestines between the two sets of three-dimensional volume data 100 in time interval Δt.

Specifically, position-matching (positioning, alignment or registration) is performed between the two sets of three-dimensional volume data 100 so that the voxel values of the two sets of three-dimensional volume data coincide with each other. Then, the motion information about the motion of the intestines between the two sets of volume data 100 in the time interval Δt is obtained.

Figure 3A:
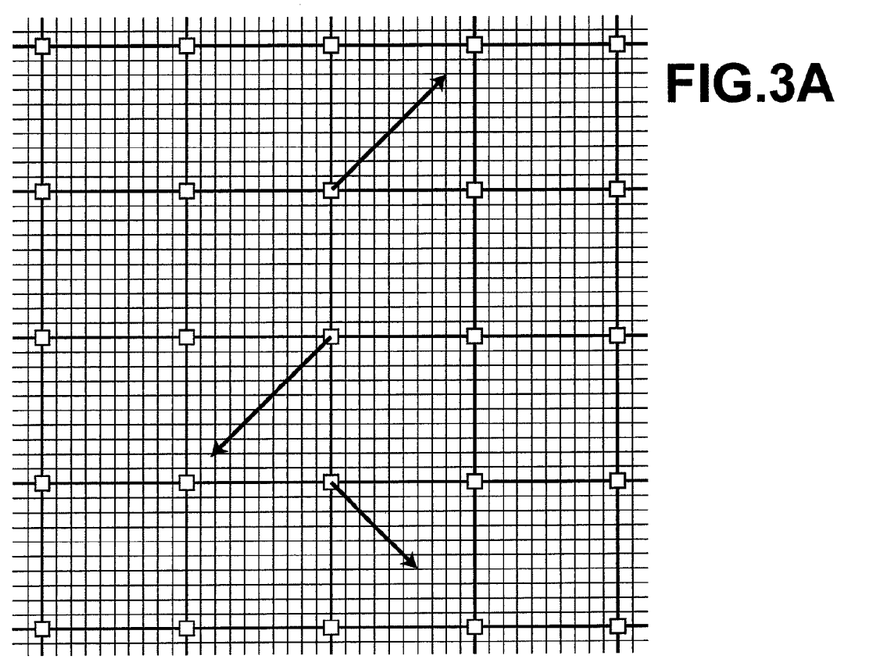
FIG. 3A is a diagram for explaining transformation of a three-dimensional space (No. 1)
Figure 3B:
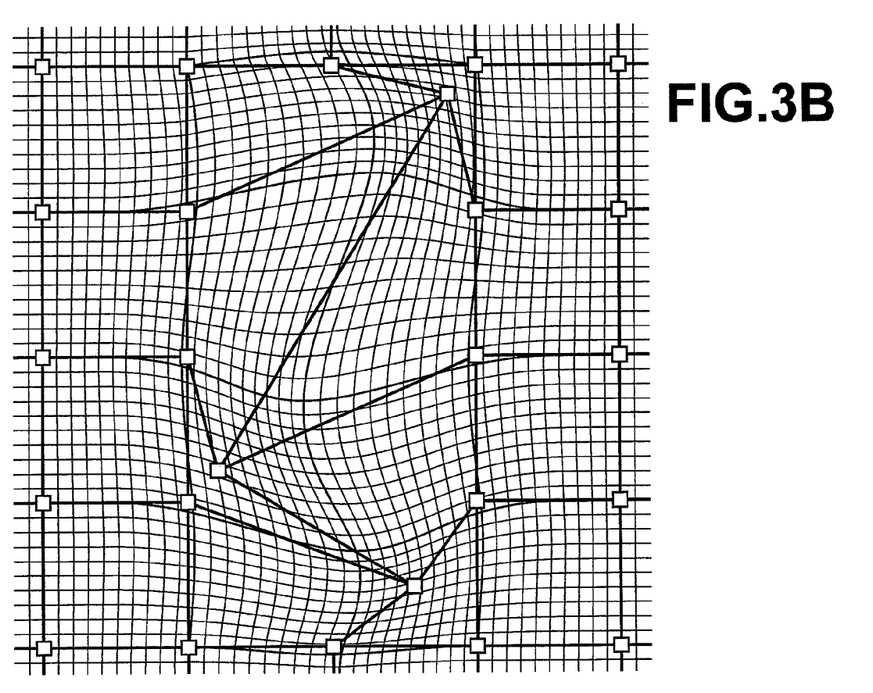
FIG. 3B is a diagram for explaining transformation of a three-dimensional space (No. 2)
Figure 4:
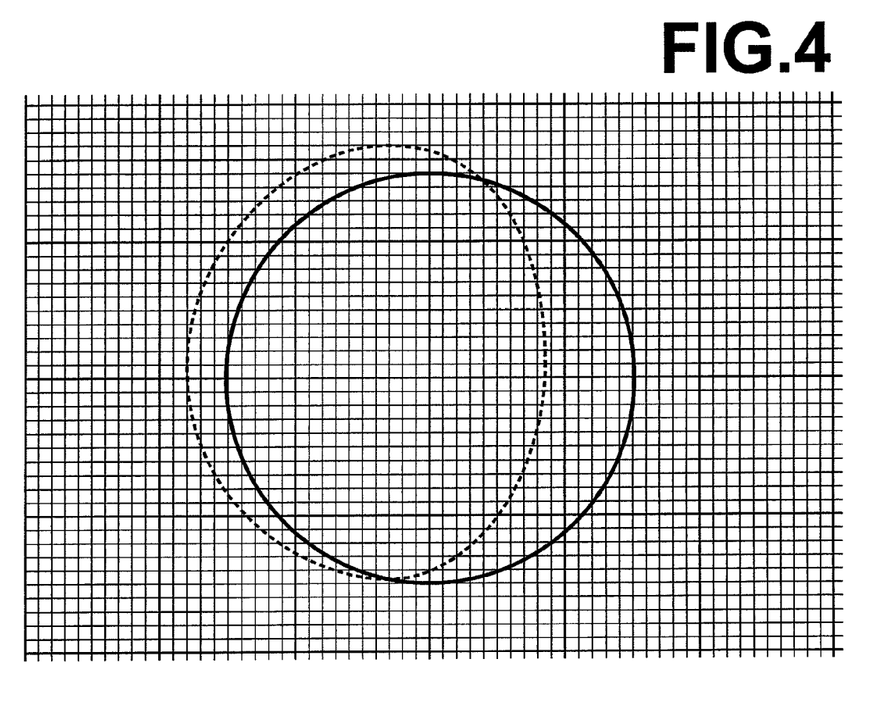
FIG. 4 is a diagram illustrating an example of the positions of feature points between two temporal phases.
Figure 5:
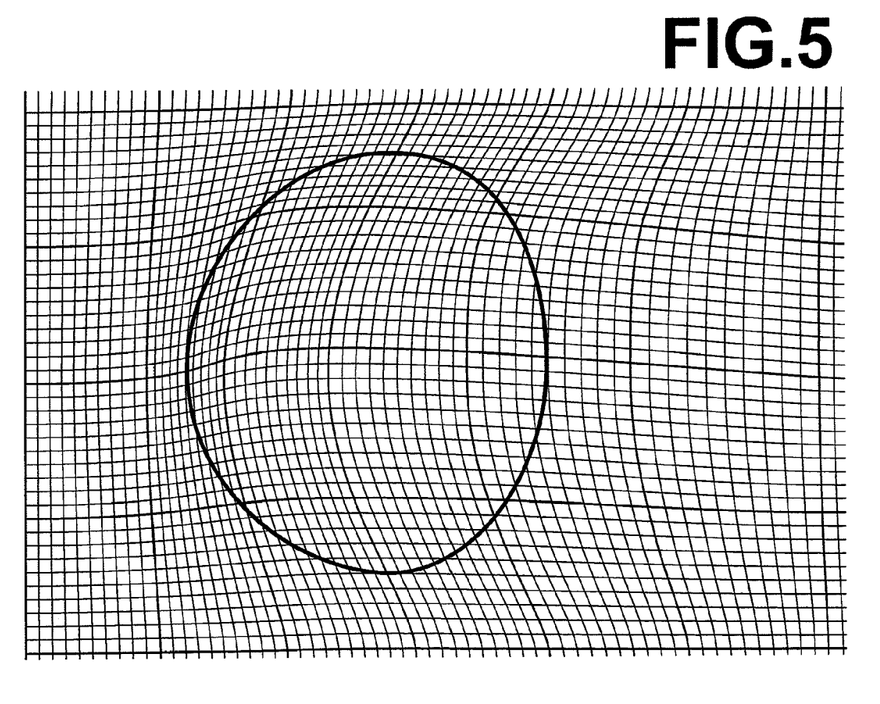
FIG. 5 is a diagram for explaining a method for performing position-matching so that feature points coincide with each other

Position-matching may be performed, for example, by using the following method. An image is transformed by transforming a three-dimensional space so that the voxel values of one set of three-dimensional volume data coincide with the voxel values of a different set of three-dimensional volume data. As illustrated in FIG. 3A, B-Spline control points (squares in FIG. 3A) are arranged in three-dimensional grid form at constant intervals within a three-dimensional space. Then, the control points are moved in the directions of arrows. Accordingly, the three-dimensional space is transformed, as illustrated in FIG. 3B. The three-dimensional space is transformed so that the voxel values of the three-dimensional volume data coincide with each other between the two different sets of three-dimensional volume data. The three-dimensional space is transformed so that the shape (solid line) of an object at time t and the shape (broken line) of the object at time t+Δt, as illustrated in FIG. 4, coincide with each other between two temporal phases, as illustrated in FIG. 5. The movement amounts of the control points for transforming the three-dimensional space as described above are obtained as motion information about the motion of the organ, which is a projection target, between the two sets of volume data 100. Voxel values exactly coincide with each other between two sets of volume data only in a rare occasion. Therefore, in actual processing, most similar positions are detected by searching the volume data by using SID (squared intensity difference) method or CC (correlation coefficient) method and position-matching is performed. In the SID method, a position at which the square of a difference between two images becomes small is obtained. In the CC method, a position at which a correlation coefficient becomes high is obtained. In the above explanation, a case of transforming the three-dimensional space by moving the B-Spline control points has been described. Alternatively, a space may be described by using a different interpolation equation and the three-dimensional space may be transformed.

Figure 6:
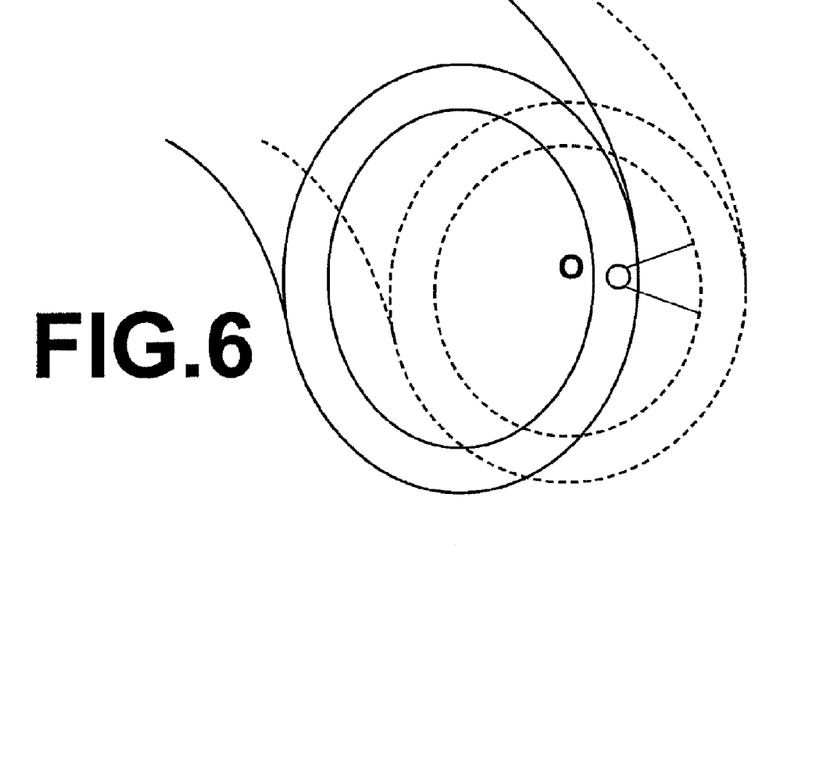
FIG. 6 is a diagram for explaining the motion of an organ and the position of a viewpoint.
Figure 7:
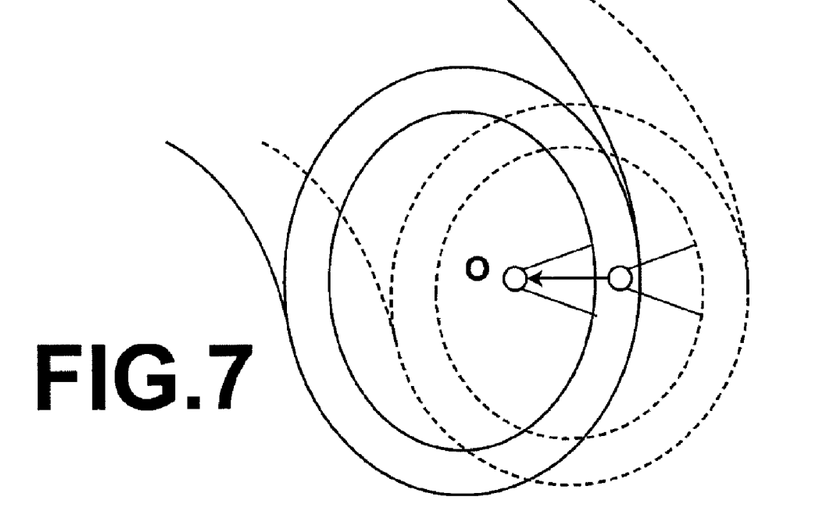
FIG. 7 is a diagram for explaining the movement of the viewpoint.

The viewpoint movement means 40 moves the viewpoint O based on the motion information. When a moving organ (moving internal organ) is imaged, if projection is performed without moving the viewpoint O, the viewpoint O becomes submerged in the intestines and it becomes impossible to project the inner wall of the intestines, as illustrated in FIG. 6 (In FIG. 6, the broken line indicates the position at time t and the solid line indicates the position at time t+Δt). Therefore, as illustrated in FIG. 7, the viewpoint O is moved (the arrow in FIG. 7), based on the transformed three-dimensional space, so that the inner wall of the intestines can be projected also at time t+Δt. The viewpoint O is moved so that a projection image can be generated at time t+Δt by projecting the inner surface of the intestines from the inside thereof in a manner similar to the generation of the projection image at time t.

The second projection means 50 generates a projection image by projecting the intestines from the moved viewpoint O by using the three-dimensional volume data 100 at time t+Δt in a manner similar to the generation of the projection image by the first projection means 20.

Figure 8:
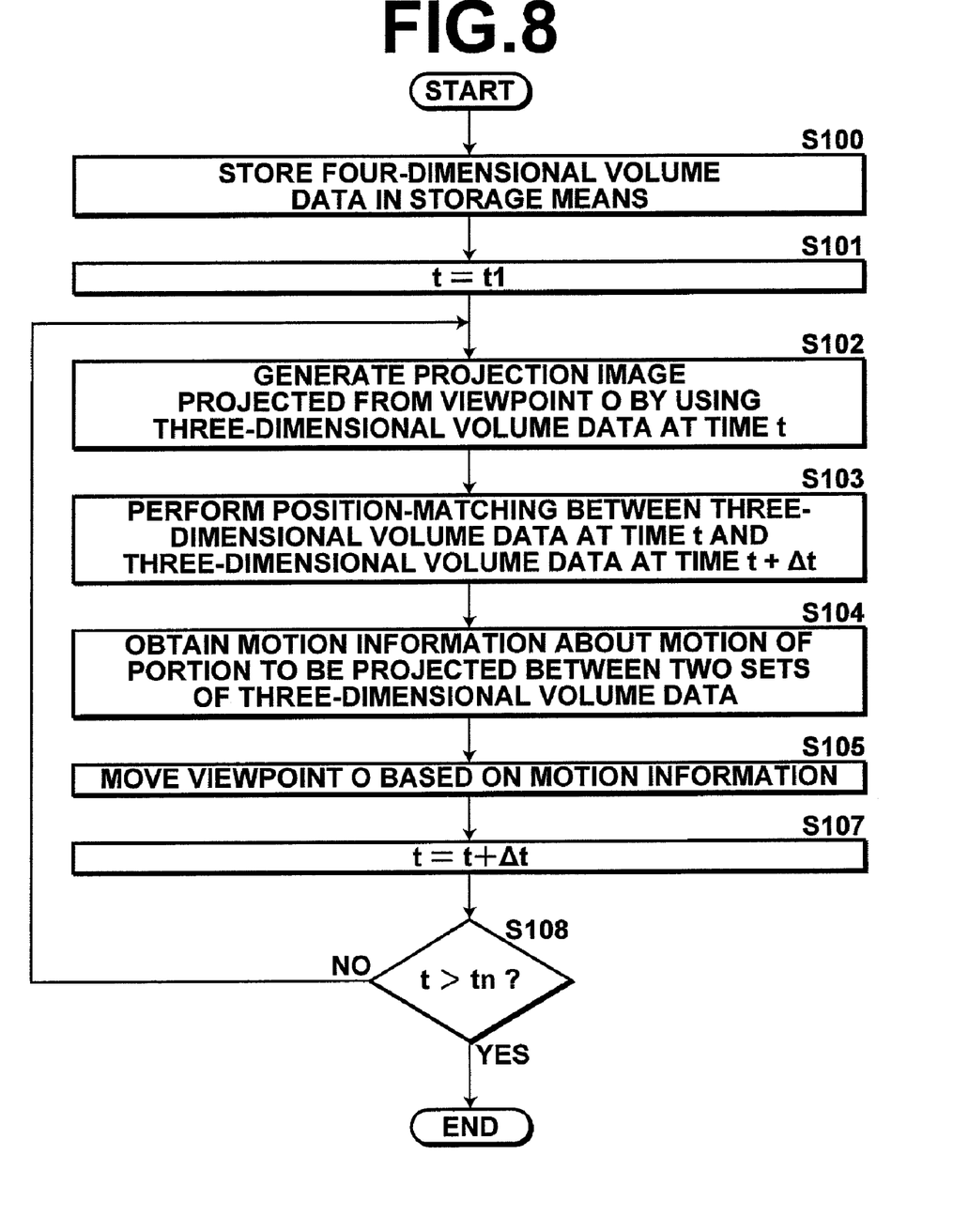
FIG. 8 is a flowchart for explaining the flow of processing of the projection image generation apparatus.

Next, the flow of processing for generating a projection image by projecting a moving organ by using the projection image generation apparatus of the present invention will be described with reference to the flowchart of FIG. 8.

A subject, which is a diagnostic target, is imaged at predetermined time intervals Δt by using a CT apparatus or the like to obtain a group of sets of three-dimensional volume data (four-dimensional volume data 110). Then, the group of sets of three-dimensional volume data is stored in a hard disk (storage means 10) (step S100). First, the first projection means 20 uses three-dimensional volume data 100 at time t1 (step S101). The first projection means 20 sets viewpoint O at a position corresponding to the position of a camera so that the same image as an image that can obtained by imaging the inside of the intestines by using an endoscope is obtained. Then, the first projection means 20 generates a projection image by projecting the inner wall of the intestines from the viewpoint O (step S102).

Next, a projection image is generated from three-dimensional volume data 100 at time t2 (=t1+Δt), which follows time t1. The projection image is generated to observe the condition of the portion of the inner wall of the intestines at time t2, the portion being the same portion as the portion projected at time t1.

For that purpose, first, the motion information obtainment means 30 matches the position of the intestines in the volume data 100 at time t1 and that of the intestines in the volume data 100 at time t2 with each other (step S103). Then, the motion information obtainment means 30 obtains motion information about the motion of the intestines between the two sets of volume data 100 as a movement amount of the position of a control point in transformation of the three-dimensional space (step S104).

The viewpoint movement means 40 moves the viewpoint O according to the transformation of the three-dimensional space. The viewpoint movement means 40 moves the viewpoint O, based on the motion information obtained by the motion information obtainment means 30, so that the inner wall of the intestines can be projected in a manner similar to the projection at time t1 (please refer to FIG. 5) (step S105).

Then, the three-dimensional volume data 100 to be projected are switched from the volume data 100 at time t1 to the volume data 100 at time t2 (=t1+Δt) (step S106). Then, the second projection means 50 generates a projection image by projecting the inner wall of the intestines in the volume data at time t2 from the moved viewpoint O (step S102).

Further, when the inner wall of the intestines in volume data 100 at time t3, . . . , tn is projected, motion information about the motion of the intestines to be projected in time interval Δt is obtained and the viewpoint O is moved based on the motion information. Accordingly, projection images are repeatedly generated based on the volume data 100 at time t3, . . . , tn, respectively (steps S102 through S107).

As described above, projection images are generated by constantly projecting the same position of the intestines. The projection images are generated from a plurality of sets of three-dimensional volume data that have been obtained by imaging a subject at predetermined time intervals, respectively. Therefore, it is possible to generate images that are in the same condition as those obtained by imaging using an endoscope. Further, it is possible to observe the condition of the organ that is moving.

In the above description, a method for matching the positions between two temporal phases by transforming the three-dimensional space has been described. The position-matching may be performed by using various kinds of technique that are called registration. Here, when point $x_A$ in image A represented by the voxel data 100 at time t is converted to point $x_R$ in image R represented by the voxel 100 at time t+Δt, if a conversion function is T, conversion function T can be expressed as follows:

$$T: x_A \to x_R$$

$$T(x_A) = x_R \tag{1}$$

When the shape of each organ is regarded as a rigid body (rigid object), the conversion function is expressed by the movement $(t_x, t_y, t_z)$ in each of the X-axis direction, the Y-axis direction and the Z-axis direction within the three-dimensional space and the rotation $(\alpha, \beta, \gamma)$ of each of the axes, and conversion function T can be expressed as follows:

$$T = \begin{pmatrix} \cos\beta\cos\gamma & \cos\alpha\cos\gamma + \sin\alpha\sin\beta\cos\gamma & \sin\alpha\sin\gamma - \cos\alpha\sin\beta\cos\gamma & t_x \\ -\cos\beta\sin\gamma & \cos\alpha\cos\gamma - \sin\alpha\sin\beta\sin\gamma & \sin\alpha\cos\gamma + \cos\alpha\sin\beta\sin\gamma & t_y \\ \sin\beta & -\sin\alpha\cos\beta & \cos\alpha\cos\beta & t_z \\ 0 & 0 & 0 & 1 \end{pmatrix} \tag{2}$$

If the organ is regarded as a non-rigid body (non-rigid object) because some organs change their shapes, the degree of freedom increases. Therefore, the conversion function T is expressed by a complex function including a polynomial and a spline function.

In actual cases, some anatomical points that are characteristic features of each organ (for example, three points) may be detected. Then, a conversion function may be obtained based on the detected points. Alternatively, the conversion function may be obtained by determining the outline of an image and by repeating fitting so that a distance from a dot string (line) corresponding to the surface of another image becomes the shortest. Alternatively, the degree of similarity may be obtained by using the voxel values of all the voxels in images. Then, the conversion function may be obtained by superposing the images based on the degree of similarity (for details, please refer to the Journal of Japanese Society of Radiological Technology, Vol. 53, No. 1, pp. 60-65, 2003, and the like).

Figure 9:
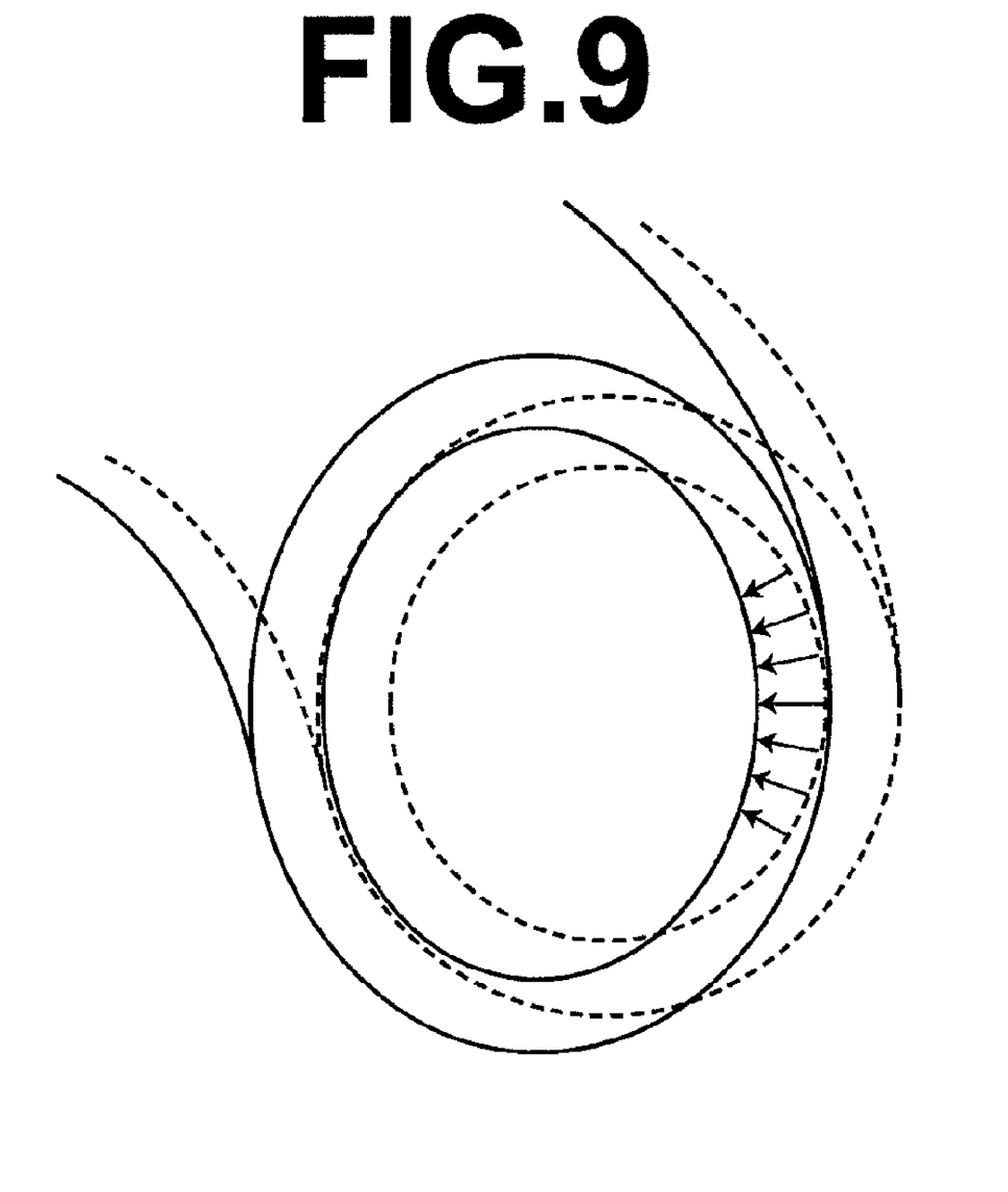
FIG. 9 is a diagram for explaining motion information.

The motion information obtainment means 30 can identify, based on the result of position-matching as described above, the position of the portion of the inner wall of the intestines at time t+Δt, the portion having been projected at time t. Therefore, for example, as illustrated in FIG. 3, a vector quantity representing the motion of the portion of the inner wall of the intestines is obtained as motion information (In FIG. 9, the broken line indicates the position at time t and the solid line indicates the position at time t+Δt). The viewpoint movement means 40 may move the viewpoint O based on the vector.

In the above description, the case, in which an image of the inside of a tubular hollow organ is generated as if the inside of the tubular hollow organ is observed by using an endoscope, has been described by using the intestines as an example. Alternatively, projection images of a moving organ, such as the heart, may be generated by projecting the organ from the inside thereof and from the outside thereof. Accordingly, it is possible to observe a change in the motion condition of each organ.

As described above, in observation of the organ or the like, when the viewpoint is positioned on the outside of the organ to be observed and the outside of the organ is observed, the viewpoint movement means moves the viewpoint so that the viewpoint is constantly positioned on the outside of the organ even if the organ moves. When the inside of the organ is observed, the viewpoint movement means moves the viewpoint so that the viewpoint is constantly positioned on the inside of the organ even if the organ moves. Accordingly, it is possible to generate a projection image in such a manner that the same point of the organ is constantly projected.

What is claimed is:

1. A projection image generation apparatus comprising:
 a volume data storage means for storing a group of sets of three-dimensional volume data that have been obtained by imaging a subject at predetermined time intervals;
 a first projection means for generating a projection image by projecting, from one viewpoint, a projection target that is present in one set of three-dimensional volume data in the group of sets of three-dimensional volume data;
 a motion information obtainment means for obtaining, based on the projection target that is present in the one set of three-dimensional volume data and the projection target that is present in a different set of three-dimensional volume data in the group of sets of three-dimensional volume data that was obtained by imaging at a different time from the time of imaging of the one set of three-dimensional volume data, motion information about the motion of the projection target between the two sets of three-dimensional volume data;
 a viewpoint movement means for moving the viewpoint based on the motion information that has been obtained by the motion information obtainment means; and
 a second projection means for generating a projection image by projecting, from a viewpoint to which the viewpoint has been moved by the viewpoint movement means, the projection target that is present in the different set of three-dimensional volume data.

2. A projection image generation apparatus, as defined in claim 1, wherein if the position of the viewpoint is present on the inner side of the surface of the projection target when the one set of three-dimensional volume data is projected, the viewpoint movement means moves the viewpoint so that the viewpoint is present on the inner side of the surface of the projection target in the different set of three-dimensional volume data, and wherein if the position of the viewpoint is present on the outer side of the surface of the projection target when the one set of three-dimensional volume data is projected, the viewpoint movement means moves the viewpoint so that the viewpoint is present on the outer side of the surface of the projection target in the different set of three-dimensional volume data.

3. A non-transitory computer-readable medium comprising a program for causing a computer to function as:
 a first projection means for generating a projection image by projecting, from one viewpoint, a projection target that is present in one set of three-dimensional volume data in a group of sets of three-dimensional volume data that have been obtained by imaging a subject at predetermined time intervals;

a motion information obtainment means for obtaining, based on the projection target that is present in the one set of three-dimensional volume data and the projection target that is present in a different set of three-dimensional volume data in the group of sets of three-dimensional volume data that was obtained by imaging at a different time from the time of imaging of the one set of three-dimensional volume data, motion information about the motion of the projection target between the two sets of three-dimensional volume data;

a viewpoint movement means for moving the viewpoint based on the motion information that has been obtained by the motion information obtainment means; and a second projection means for generating a projection image by projecting, from a viewpoint to which the viewpoint has been moved by the viewpoint movement means, the projection target that is present in the different set of three-dimensional volume data.

4. A projection image generation method comprising:

a first projection step for generating a projection image by projecting, from one viewpoint, a projection target that is present in one set of three-dimensional volume data in a group of sets of three-dimensional volume data that have been obtained by imaging a subject at predetermined time intervals;

a motion information obtainment step for obtaining, based on the projection target that is present in the one set of three-dimensional volume data and the projection target that is present in a different set of three-dimensional volume data in the group of sets of three-dimensional volume data that was obtained by imaging at a different time from the time of imaging of the one set of three-dimensional volume data, motion information about the motion of the projection target between the two sets of three-dimensional volume data;

a viewpoint movement step for moving the viewpoint based on the motion information that has been obtained in the motion information obtainment step; and a second projection step for generating a projection image by projecting, from a viewpoint to which the viewpoint has been moved in the viewpoint movement step, the projection target that is present in the different set of three-dimensional volume data.

* * * * *